Nov. 27, 1934.  O. H. JOBSKI  1,982,057

ADAPTER RING

Filed Sept. 25, 1930  2 Sheets-Sheet 1

Inventor
Otto H. Jobski
Kwis Hudson & Kent
attys.

Nov. 27, 1934.  O. H. JOBSKI  1,982,057
ADAPTER RING
Filed Sept. 25, 1930  2 Sheets-Sheet 2
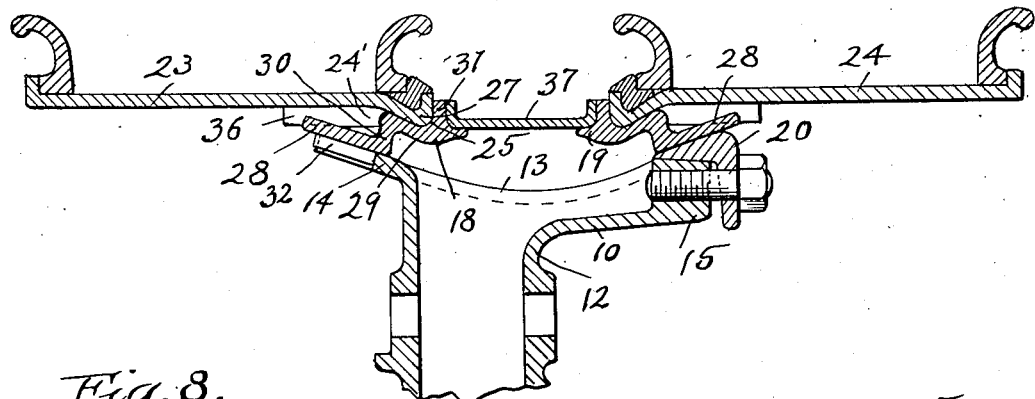
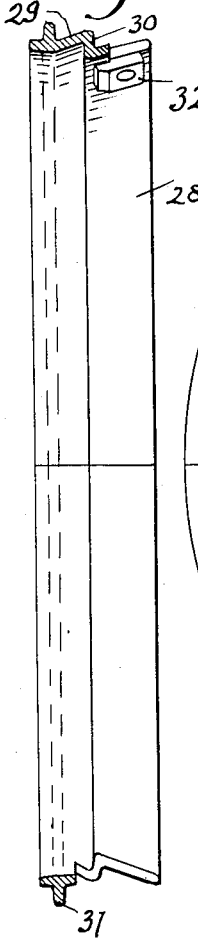
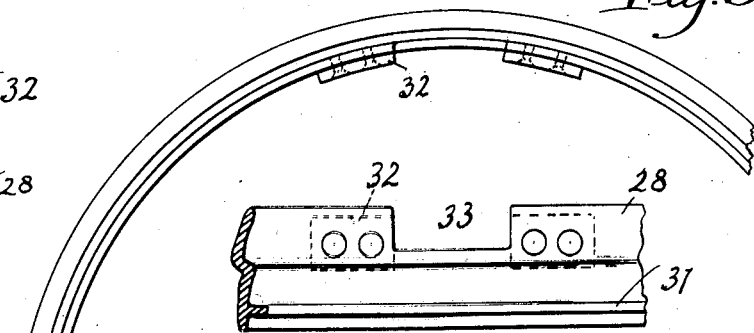
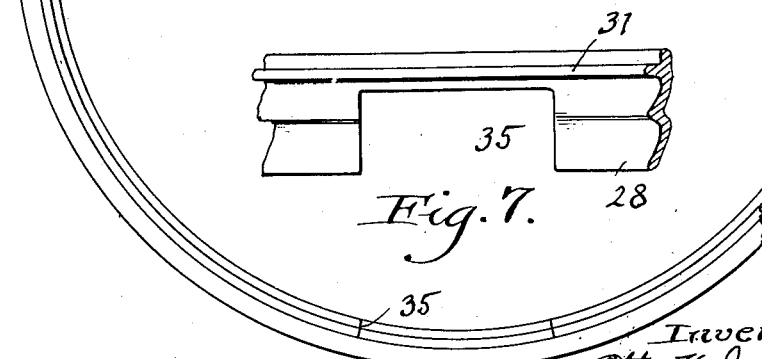
Inventor
Otto H. Jobski
Kwis Hudson & Kent
attys.

Patented Nov. 27, 1934

1,982,057

UNITED STATES PATENT OFFICE 1,982,057

ADAPTER RING

Otto H. Jobski, Cleveland, Ohio, assignor to The West Steel Casting Company, Cleveland, Ohio, a corporation of Ohio Application September 25, 1930, Serial No. 484,384

5 Claims. (Cl. 301—10)

This invention relates to vehicle wheels of the type adapted to have pneumatic tire rims removably mounted thereon, and more particularly to adapter means for such wheels whereby tire rims of different makes or designs may be selectively applied on the same wheel.

It is well known that the wheels of certain vehicles, such as trucks and busses, are often designed so that they are adapted to have tire rims of the design of a certain tire manufacturer removably mounted thereon, and if the purchaser of the vehicle desires to use tires and tire rims of the design of another tire manufacturer, he is put to the expense of exchanging the wheels of the vehicle for wheels which will accommodate the tire rims of the latter manufacturer.

Therefore, as an object of this invention I aim to provide means for adapting a vehicle wheel to receive tire rims of different designs.

Another object of this invention is to provide a vehicle wheel having novel adapter means applied thereto whereby tire rims of different designs may be removably mounted on said wheel.

Other objects and advantages of the invention will be apparent from the following description when taken in conjunction with the accompanying sheets of drawings in which Figure 1 is an elevation partly in section showing a vehicle wheel of the dual tire type employing the adapter means of my invention and having tire rims of one design mounted thereon.

Fig. 2 is a similar view of a vehicle wheel employing the adapter means of my invention and having tire rims of another design mounted thereon.

Fig. 5 is a side elevational view of an adapter ring constructed according to my invention.

Figs. 6 and 7 are partial plan views thereof; and

Fig. 8 is a sectional view taken substantially diametrically across the adapter ring shown in Fig. 5.

Figure 1:
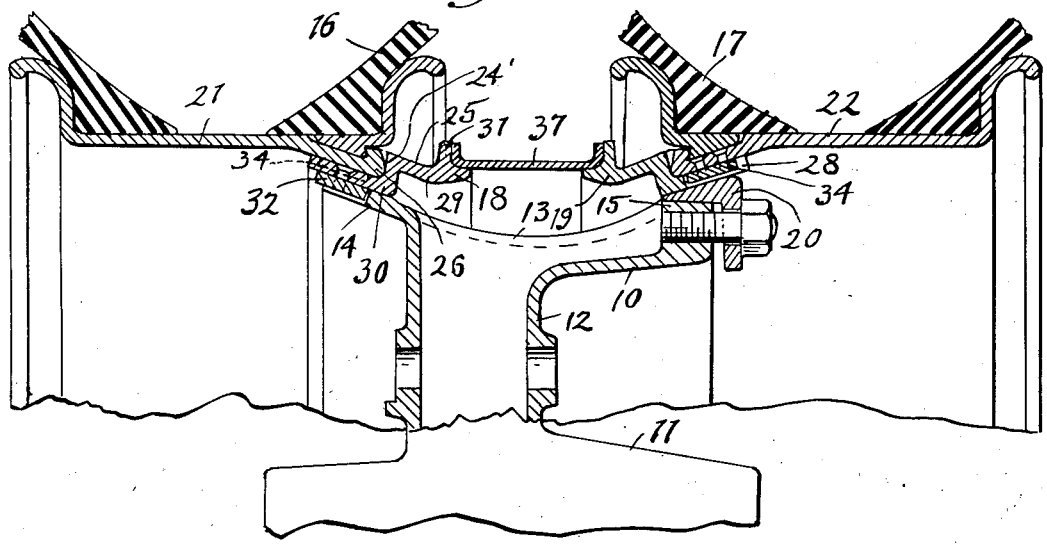

In the drawings to which detailed reference will now be made, I have shown vehicle wheels having the adapter means of my invention applied thereto whereby such wheels are adapted to be selectively equipped with tire rims of different designs. In Figs. 1 and 2 I have shown my adapter means applied to a vehicle wheel 10 of the dual tire type which is suitable for use on trucks or busses and for other purposes. This wheel may be of any appropriate form or design, but is preferably constructed as a single casting, such as a steel casting, comprising a hub 11 having spokes 12 extending radially therefrom, and an outer circumferentially extending rim portion 13. This rim portion is formed with circumferentially extending felly portions 14 and 15 which are spaced axially of the wheel so as to provide adjacent mountings for the dual tires 16 and 17.

Heretofore, in the construction of vehicle wheels which have been designed to have tire rims removably mounted thereon, the felly portions of the wheels have been made of proper diameter to have the tire rims mounted directly thereon. According to my invention, however, the felly portions 14 and 15 of the wheels are constructed so that their diameters are somewhat smaller than would be required if tire rims were to be mounted directly thereon, but are of a size to receive adapter rings 18 and 19 upon which the tire rims are mounted. Aside from being of somewhat smaller diameter, these felly portions 14 and 15 are substantially the same in form as have been used heretofore, that is to say, the felly portion 14, which normally is nearest the center line of the vehicle, is inclined or tapered, while the felly portion 15, which normally is most remote from the center line of the vehicle, has a substantially flat perimeter and is provided at circumferentially spaced points with retaining lugs 20.

In Fig. 1 of the drawings I have shown tire rims 21 and 22 mounted respectively upon the adapter rings 18 and 19. These tire rims are of a well known form of construction since they are a part of the commercially available product of a large tire manufacturing concern. In Fig. 2 of the drawings I have shown tire rims 23 and 24 mounted upon the adapter rings 18 and 19. The rims 23 and 24, although of a different design from the tire rims 21 and 22 shown in Fig. 1, are also commercially available and of a well known construction. For convenience in referring to the drawings I have designated the adapter rings and the tire rims shown in Figs. 1 and 2, with separate reference characters, but it should be understood that adapter rings 18 and 19 are identical in construction, and that tire rims 21 and 22 are identical with each other as are also the tire rims 23 and 24.

By comparing the tire rims illustrated in Figs. 1 and 2 of the drawings it will be seen that while the two different designs of rims have base portions which are of somewhat similar cross sectional shape, these base portions are not only of different diameters, but are also of different widths. In order that the adapter ring of my invention may serve efficiently as the mounting means for either form of tire rim, I have constructed the adapter ring with a pair of circumferentially extending rim retaining grooves 24' and 25. These grooves are of proper diameter, and of a cross sectional shape, to correspond respectively, with the inclined annular base portions 26 and 27 of the two different forms of rims. The adapter ring is substantially circular in form but is split at one point of its circumference so that by engagement of the inclined annular flange portion 28 with the felly portion 14, or with the lugs 20 of the felly portion 15, the adapter ring can be wedged outwardly against the tire rim mounted thereon. The flange portion 28 of the adapter ring also forms the bottom of the groove 24' which cooperates with the tire rim 21. Another laterally extending flange portion 29 of the adapter ring forms the bottom for the groove 25, and is integrally connected to the flange portion 28 by the annular web portion 30 which forms a retaining shoulder for the rim 21, and also forms a side wall of the groove 24'. An annular flange portion 31 extending radially from the flange portion 29 forms a side wall of the groove 25 and also forms a retaining shoulder which cooperates with the edge of the rim 23.

To establish a driving connection between the felly portion 14 and the adapter ring 18 applied thereto, I have provided the adapter ring with driving lugs 32 upon the inner face thereof, which engage in a recess formed in the felly portion. Likewise to establish a driving connection between the adapter ring 18 and the tire rim mounted thereon, I provide the adapter ring with a recess 33 formed through the flange 28 between the driving lugs 32, and which is suitably shaped to receive the lug 34 which is carried by the tire rim 21. To establish a driving connection between the adapter ring and a tire rim of the form illustrated in Fig. 2 when such rim is applied to the wheel, I provide the adapter ring with a recess 35 which extends through the flange 28 and through the web portion 30 and also through a part of the flange 29 so as to receive the lug 36 which is secured to the inner face of the rim 23. From the arrangement which I have just described it will be seen that when tire rims of the form shown in Fig. 1 are mounted upon the vehicle wheel the portion 26 of these tire rims engages in the annular groove 24' while the lug 34 carried by such rims engages in the recess 33 of the adapter ring. When tire rims of the type illustrated in Fig. 2 are mounted on the wheel the edge portion 27 of these rims engages in the groove 25 of the adapter ring while the lug 36 of such rims engages in the recess 35 of the adapter ring. Driving connection between the adapter ring 19 and tire rims 22 and 24 is established by engagement of the lugs 34 and 36 of these rims in the recesses 33 and 35 of the adapter ring in the same manner that the driving connection is established between the adapter ring 18 and the tire rims mounted thereon. A driving connection between the adapter ring 19 and the felly portion 15 of the wheel is established by tightening the nuts for the lugs 20 whereby these lugs are moved axially of the wheel and wedged into engagement with the adapter ring. An annular, substantially channel-shaped spacer member 37 arranged between the pair of adapter rings 18 and 19 engages the shoulders 31 and prevents the adapter ring 18 from becoming disengaged from the felly portion 14 of the wheel.

Figures 3, 4:
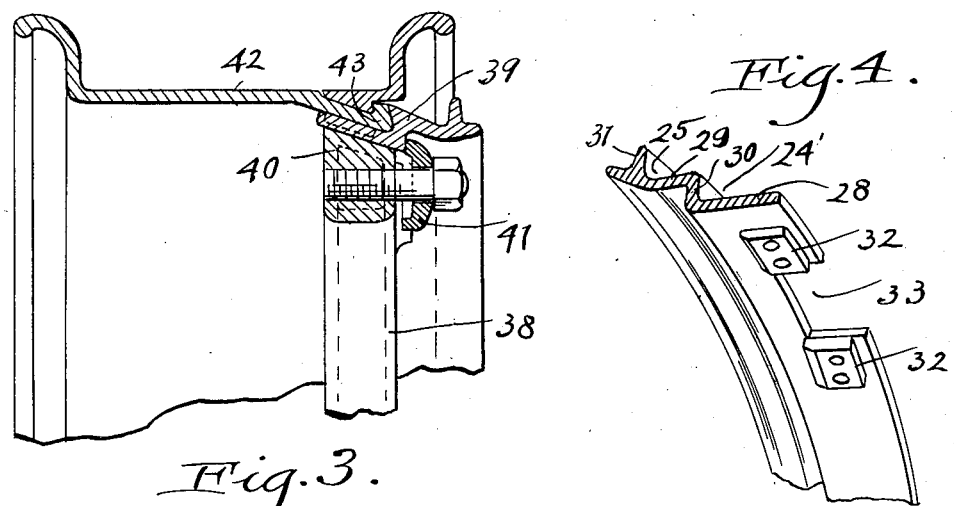
Fig. 3 is a sectional view showing my adapter applied to a wheel of the single tire type.
Fig. 4 is a perspective view illustrating the construction of one portion of my adapter ring.

In Fig. 3 of the drawings I have shown a vehicle wheel 38 which is of the type adapted for single tire mounting. This wheel is provided with an adapter ring 39 which is identical with the adapter rings 18 and 19 described in detail in connection with Figs. 1 and 2. This adapter ring is retained in engagement with the felly portion 40 of the wheel by suitable clamping lugs 41 which are spaced circumferentially about the wheel. A tire rim 42 of the type shown in Fig. 1 is mounted on the adapter ring and retained thereon by engagement of the annular portion 43 thereof in an annular groove of the ring. While I have shown only one form of tire rim applied to the adapter ring of this wheel, it will be understood of course, that a tire rim of the type illustrated in Fig. 2 may also be mounted upon this adapter ring.

It will now be readily understood from the foregoing description and from the accompanying drawings that I have provided adapter means whereby vehicle wheels are adapted to employ tire rims of different designs. The adapter means which I have provided enables the owner of a vehicle to use interchangeably the tires and tire rims of different manufacturers upon the vehicle without the need of first removing the wheels of the vehicle and substituting other wheels of a different design.

While I have illustrated and described my invention in a detailed manner it should be understood however that I do not intend to limit myself to the precise details and arrangement of parts illustrated and described, but regard my invention as including such changes and modifications as do not involve a departure from the spirit of the invention and the scope of the appended claims.

Having thus described my invention I claim:

1. In combination a vehicle wheel, and means for adapting said wheel to receive tire rims of different makes, said means comprising a detachable adapter ring having an annular surface for wedging engagement with said wheel and a plurality of rim retaining grooves for cooperation respectively with tire rims of different makes.

2. The combination with a vehicle wheel having an inclined felly portion, of tire rim retaining means including a ring member having an annular flange adapted to engage said inclined felly for wedging said member outwardly against said tire rim, said member being of such cross-sectional shape as to adapt said wheel to receive tire rims of different designs.

3. The combination of a vehicle wheel provided with retaining lugs, means for adapting said wheel to receive tire rims of different designs comprising a detachable ring member having annular retaining shoulders on the outside thereof for cooperation respectively with tire rims of different designs and an annular shoulder on the inside thereof which is engaged by said retaining lugs, means for establishing a driving connection between said wheel and said ring member, and means for establishing a driving connection between said ring member and a tire rim.

4. The combination with a vehicle wheel of the dual tire type having spaced oppositely inclined tire rim mounting means thereon, of annular adapter members on said inclined mounting means, each of said members being provided with retaining means adapted to cooperate with tire rims of different makes, and means for retaining said adapter members in spaced relation.

5. An adapter for a vehicle wheel comprising a detachable ring having an annular flange adapted for driving connection with said wheel and for engagement with a tire rim, said ring having a second annular flange adapted for engagement with a tire rim of different design, an annular rim retaining shoulder associated with said second flange, and a web integrally connecting said flanges and forming a rim retaining shoulder for the first mentioned flange.

OTTO H. JOBSKI.